(12) United States Patent
Briggs et al.

(10) Patent No.: US 10,431,116 B2
(45) Date of Patent: Oct. 1, 2019

(54) ORATOR EFFECTIVENESS THROUGH REAL-TIME FEEDBACK SYSTEM WITH AUTOMATIC DETECTION OF HUMAN BEHAVIORAL AND EMOTIONAL STATES OF ORATOR AND AUDIENCE

(71) Applicant: International Business Machines Corporation, Armonk, NY (US)

(72) Inventors: Benjamin D. Briggs, Waterford, NY (US); Lawrence A. Clevenger, LaGrangeville, NY (US); Leigh Anne H. Clevenger, Rhinebeck, NY (US); Jonathan H. Connell, II, Cortlandt Manor, NY (US); Nalini K. Ratha, White Plains, NY (US); Michael Rizzolo, Albany, NY (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 14/965,667

(22) Filed: Dec. 10, 2015

(65) Prior Publication Data

US 2017/0169727 A1    Jun. 15, 2017

(51) Int. Cl.
*G09B 19/04*    (2006.01)
*G09B 5/06*    (2006.01)
(Continued)

(52) U.S. Cl.
CPC ............ *G09B 19/04* (2013.01); *G09B 5/06* (2013.01); *G09B 5/125* (2013.01); *G10L 25/63* (2013.01)

(58) Field of Classification Search
CPC ............ G09B 19/04; G09B 5/06; G09B 5/125
See application file for complete search history.

(56) References Cited

U.S. PATENT DOCUMENTS 6,654,588 B2    11/2003  Moskowitz et al.
7,818,179 B2 *  10/2010  Krasikov ............... G09B 19/04
                                                    434/185

(Continued)

OTHER PUBLICATIONS

Toastmasters International, "Gestures: Your Body Speaks", retrieved from the internet at http://web.mst.edu/~toast/docs/Gestures.pdf, revision Jun. 2011.*

(Continued)

*Primary Examiner* — Eddy Saint-Vil
(74) *Attorney, Agent, or Firm* — Vazken Alexanian; Michael J. Chang, LLC (57) ABSTRACT

Techniques for leveraging the capabilities of wearable mobile technology to collect data and to provide real-time feedback to an orator about his/her performance and/or audience interaction are provided. In one aspect, a method for providing real-time feedback to a speaker making a presentation to an audience includes the steps of: collecting real-time data from the speaker during the presentation, wherein the data is collected via a mobile device worn by the speaker; analyzing the real-time data collected from the speaker to determine whether corrective action is needed to improve performance; and generating a real-time alert to the speaker suggesting the corrective action if the real-time data indicates that corrective action is needed to improve performance, otherwise continuing to collect data from the speaker in real-time. Real-time data may also be collected from members of the audience and/or from other speakers (if present) via wearable mobile devices.

15 Claims, 3 Drawing Sheets

(51) Int. Cl.
*G09B 5/12* (2006.01)
*G10L 25/63* (2013.01)

(56) References Cited

U.S. PATENT DOCUMENTS

| | | | |
|---|---|---|---|
| 7,870,494 B2 | 1/2011 | Lentz | |
| 7,941,318 B2* | 5/2011 | Lu | G09B 5/04 |
| | | | 704/270 |
| 8,036,898 B2* | 10/2011 | Sato | G10L 25/78 |
| | | | 704/233 |
| 8,670,018 B2* | 3/2014 | Cunnington | G06Q 10/10 |
| | | | 348/14.08 |
| 8,725,842 B1 | 5/2014 | Al-Nasser | |
| 8,943,526 B2 | 1/2015 | Rivera et al. | |
| 9,028,405 B2 | 5/2015 | Tran | |
| 9,257,122 B1* | 2/2016 | Cancro | G10L 17/26 |
| 9,792,908 B1* | 10/2017 | Bassemir | G10L 15/22 |
| 2005/0131697 A1* | 6/2005 | Brown | G09B 5/00 |
| | | | 704/270 |
| 2009/0070798 A1 | 3/2009 | Lee et al. | |
| 2011/0292162 A1* | 12/2011 | Byun | H04N 7/147 |
| | | | 348/14.08 |
| 2011/0295392 A1* | 12/2011 | Cunnington | G06Q 10/10 |
| | | | 700/90 |
| 2012/0072939 A1* | 3/2012 | Crenshaw | H04H 60/33 |
| | | | 725/12 |
| 2013/0227420 A1* | 8/2013 | Pasquero | H04L 12/1813 |
| | | | 715/730 |
| 2014/0006326 A1* | 1/2014 | Bazanov | G09B 7/00 |
| | | | 706/46 |
| 2014/0051054 A1* | 2/2014 | Wong | G09B 7/02 |
| | | | 434/350 |
| 2014/0136626 A1* | 5/2014 | Teevan | G06F 15/00 |
| | | | 709/205 |
| 2014/0229866 A1* | 8/2014 | Gottlieb | H04L 65/403 |
| | | | 715/758 |
| 2014/0266787 A1* | 9/2014 | Tran | A61B 5/0022 |
| | | | 340/870.07 |
| 2014/0363000 A1 | 12/2014 | Bowden et al. | |
| 2015/0177964 A1 | 6/2015 | Spirer | |
| 2015/0317647 A1* | 11/2015 | Jorge | G06Q 30/0242 |
| | | | 705/7.32 |
| 2016/0011729 A1* | 1/2016 | Flores | G06F 3/167 |
| | | | 715/728 |
| 2016/0042648 A1* | 2/2016 | Kothuri | G06F 3/015 |
| | | | 434/236 |
| 2016/0165284 A1* | 6/2016 | Bargagni | H04N 21/2187 |
| | | | 725/12 |
| 2016/0188125 A1* | 6/2016 | Kaplan | G06F 3/0481 |
| | | | 715/730 |
| 2016/0203726 A1* | 7/2016 | Hibbs | G09B 7/02 |
| | | | 434/308 |
| 2016/0266864 A1* | 9/2016 | Rajendran | G09B 5/08 |
| 2017/0169726 A1* | 6/2017 | Aguirre | G09B 19/04 |

OTHER PUBLICATIONS

L. Porzi et al., "A smart watch-based gesture recognition system for assisting people with visual impairments," Proceedings of the 3rd ACM International Workshop on Interactive Multimedia on Mobile & Portable Devices, Oct. 2013, pp. 19-24.

\* cited by examiner

ORATOR EFFECTIVENESS THROUGH REAL-TIME FEEDBACK SYSTEM WITH AUTOMATIC DETECTION OF HUMAN BEHAVIORAL AND EMOTIONAL STATES OF ORATOR AND AUDIENCE

FIELD OF THE INVENTION

The present invention relates to techniques for improving public speaking, and more particularly, to leveraging the capabilities of wearable mobile technology to collect data and to provide real-time feedback to an orator about his/her performance and/or audience interaction.

BACKGROUND OF THE INVENTION

Effective public speaking can be a difficult skill to master. There are many different factors that contribute to how well an orator presents to an audience, and how the audience reacts to the orator. If an orator is nervous and as a result rushes the speech, uses filler words, goes off topic, etc. this can be a distraction for the audience. The audience might then lose interest in the speech.

Techniques have been proposed to help orators improve their public speaking abilities. For instance, U.S. Pat. No. 7,941,318 issued to Lu, entitled "Public Speaking Self-Evaluation Tool," describes the use of microphones and cameras to provide feedback to a speaker based on speech patterns and eye movement. While such information might be analyzed after a speech has been given to enhance future speaking engagements, there is little to help the speaker make improvements while giving a speech.

Each speech given is different in the sense that it might involve a different topic, might be given to a different audience, might be at a different venue, etc. Further, the audience's attention level might vary depending on external factors such as the amount of distraction (e.g., noise, temperature, etc.), time of day, etc. Thus, feedback collected after the fact from one speaking engagement might not apply to another, different audience, different venue, etc.

Accordingly, techniques for collecting real-time comprehensive data and providing immediate feedback to an orator about his/her performance and/or level of audience interest and participation would be desirable.

SUMMARY OF THE INVENTION

The present invention provides techniques for leveraging the capabilities of wearable mobile technology to collect data and to provide real-time feedback to an orator about his/her performance and/or audience interaction. In one aspect of the invention, a method for providing real-time feedback to a speaker making a presentation to an audience includes the steps of: collecting real-time data from the speaker during the presentation, wherein the data is collected via a mobile device worn by the speaker; analyzing the real-time data collected from the speaker to determine whether corrective action is needed to improve performance; and generating a real-time alert to the speaker suggesting the corrective action if the real-time data indicates that corrective action is needed to improve performance, otherwise continuing to collect data from the speaker in real-time. Real-time data may also be collected from members of the audience and/or from other speakers (if present) via wearable mobile devices.

A more complete understanding of the present invention, as well as further features and advantages of the present invention, will be obtained by reference to the following detailed description and drawings.

DETAILED DESCRIPTION OF PREFERRED EMBODIMENTS

As provided above, real-time, continuous feedback is necessary for public speakers (also referred to herein as orators) to fully judge their performance in front of a given audience. Even if an orator has fine-tuned his/her performance, there are external factors that can affect audience attention at a given event, and it would be helpful for the orator to know (in real-time) how the audience is receiving the speech. Thus, if there is a chance to better capture the audience's attention, the speaker can adjust his/her performance accordingly. Take, for instance, the scenario where the speaker has a well-practiced speech that she is now giving to a particular audience at a particular venue. While the speech has always been well-received at other speaking engagements, this time the speaker has been scheduled right after lunch, and the audience appears groggy. It would be helpful for the speaker to know in real-time so that she might fine tune the speech, her actions, etc. to best capture the audience's attention.

Advantageously, the present techniques leverage emerging wearable mobile technology to collect real-time data from the orator (and potentially also from the audience), and to provide real-time feedback to the orator to gauge his/her performance during public speaking. Thus in one aspect, the present techniques serve to gather real-time data from the orator. By way of example only, data that might be useful to a speaker is stress level (e.g., as an indicator of nervousness), movement/position (e.g., whether the speaker is pacing, facing the audience or away from the audience), speaking characteristics (e.g., speaking volume, pace, clarity, speaking patterns—such as the presence of filler words "um," "uh," "er," etc.).

With regard to stress levels, a speaker often wants to convey calmness to his/her audience. When nervous, the speaker might not speak clearly, might rush, might lose his/her train of thought, etc. Thus, in general, nervousness can negatively impact a speaker's performance. With that in mind, if the speaker is made aware of his/her situation, the speaker can make an effort to slow down, speak more clearly and deliberately, etc.

With regard to movement and position, when talking a speaker can sometimes pace, or make exaggerated hand movements which can distract the audience. Oftentimes, this occurs without the speaker even realizing he/she is doing it. Real-time feedback to the speaker can be helpful in curbing this behavior. Further, it is generally favorable for the speaker to face the audience and make eye contact with them. If, for example, the speaker is using slides or some other visual aid, the speaker might inadvertently spend too much time looking at them rather than at the audience. If the speaker is alerted to this fact, he/she can correct this behavior.

With regard to speech characteristics, speakers often use filler words (see above) or unnecessary pauses when nervous. This speech pattern can interrupt the flow of a presentation and negatively impact audience attention. By alerting the speaker to this speech pattern, the speaker can adjust his/her behavior to avoid using filler words, pausing, etc.

As highlighted above, the present techniques leverage wearable mobile technology, such as a commercially available smartwatch. A smartwatch, or other suitable wearable technology, may also be referred to herein as a wearable mobile feedback controller or simply a wearable controller. Smartwatches which may be used in accordance with the present techniques are available from companies such as Motorola™ (e.g., the MOTO 360), Samsung™ (e.g., Samsung Gear™), Apple™ (e.g., the Apple Watch™), etc.

Different smartwatches have different capabilities, such as a variety of different sensors, user interactive features such as voice commands, audible/motion alarms/alerts, etc. By way of example only, some of the smartwatch technology that is leveraged for the present techniques includes the following:

Sensors—the present techniques envision use of one or more sensors proximate to the user (also referred to herein as proximal sensors). These are sensors that can measure physical/physiological conditions of the user. These types of sensors generally require contact with the user to function, and thus are also referred to herein as contact sensors. For instance, one such contact sensor is an electrodermal activity or EDA sensor. EDA sensors measure the electrical characteristics of the skin. The electrical characteristics of the skin are controlled, at least in part, by the state of sweat glands in the skin, which in turn are regulated by the sympathetic nervous system. Thus, EDA sensors can gauge sympathetic and nervous responses. Thus sweating (detected via the EDA sensors) might be an indicator of the speaker's level of nervousness. Reminders can then be sent to the speaker (see below) to, e.g., speak calmly/clearly, avoid nervous pacing and/or hand gestures, etc.

Other contact sensors useful for the present techniques include pulse oximeters and heart rate sensors. A pulse oximeter measures a person's blood oxygen levels often via a sensor placed on a part of the body such as a fingertip. Similarly, a heart rate sensor measures a person's heart rate or pulse (generally in beats per minute), e.g., via a sensor placed on the chest or wrist. Similar to the EDA sensor, the speaker's heart rate can be an indicator of his/her level of nervousness. Also, as will be provided in detail below, the present techniques may be useful in monitoring the speaker's actions, but also those of the audience. For instance, audience members might consent to providing feedback to the speaker (which may include data collected via the present smartwatch-based techniques). For example, a decrease in blood oxygen levels and/or heart rate amongst the audience members might indicate that they are not actively engaged in the speech but are getting drowsy. Reminders can then be sent to the speaker (see below) to, e.g., become more animated, switch topics, etc. in an effort to better capture the audience's attention.

Other useful proximal sensors are trajectory and pose sensors. For instance, an accelerometer can be used to detect the user's movement, speed and direction. A gyroscope sensor (often used in conjunction with an accelerometer) detects direction or orientation. A rate gyroscope similarly measures the rate of change of angle with time. A global positioning system or GPS provides location information. Thus, as highlighted above, it may be useful feedback for the speaker that he/she is pacing a lot (detected, e.g., via the accelerometer and/or GPS). Also, a smartwatch is often worn on the user's wrist. Therefore, the trajectory and pose sensors can be used to detect the speaker's arm/hand movements. Reminders can then be sent to the speaker (see below) to, e.g., cease pacing, gesturing, etc.

Yet another type of sensor that is useful for the present techniques is an environmental sensor. For instance, a compass and/or a magnetometer (which measures the direction of magnetic fields) can be used to determine the physical position of the user. A barometer, air temperature sensors, wind speed sensors, etc. can be used to assess environmental conditions such as air pressure, temperature, wind velocity, etc. Environmental data might be useful in directing a speaker's performance. For instance, the audience's attention might be lessened by extreme temperatures in the room. In that case, the speaker might try to liven up his/her talk to keep the audience interested, change topics, shorten the presentation, etc.

Further, the speaker and the audience, or a portion of the audience might not be physically in the same place. For instance, the speaker may be addressing in person a small audience at one location, while the speech is being simultaneously broadcast in one or more other locations. The speaker may not, in that case, be able to see and/or assess the audience at the remote location(s). Thus, data collected from the audience (e.g., via smartwatch physical/physiological, environmental, etc. sensors) can be useful in helping the speaker best address his/her total audience, rather than just the audience physically present at the speaker's location.

Also, multiple speakers may be making a joint presentation. In that case, each speaker can employ the present techniques to maximize audience attention. For instance, each speaker individually can fine tune his/her performance in real-time based on the real-time feedback. Additionally, the speakers might also better gauge performance amongst the speakers. Thus, if one speaker gets particularly good (or particularly bad) feedback, the other speakers can learn from that and tailor their performance accordingly.

Another useful sensor is a speech detector. The speech detector can be configured to recognize certain words, speech patterns, etc. For instance, the speech detector can be set to recognize filler words (see above), or to detect rapid speech (e.g., which may occur when the speaker is nervous), or long pauses (instances when the speaker is not speaking—which may indicate disruptive, inconsistent speech patterns), etc.

As highlighted above, the present techniques involve an interactive component, where the above-described collected data is analyzed and feedback is provided to the speaker. According to an exemplary embodiment, feedback is provided to the speaker directly via the wearable smartwatch technology. For instance, a message (voice, text, etc.) and/or any various other alerts or alarms can be used to get the speaker's attention. For instance, a text message can be sent to the user's smartwatch providing feedback to the speaker and some potential corrective action (see below) such as "speak more clearly," "slow down," "stop pacing or gesturing," etc. The message can be accompanied by other alerts meant to grab the speaker's attention. For instance, an audible alarm can alert the speaker to view text on his/her smartwatch display. Similarly, voice commands can operate in the same general manner. Visual alerts can be implemented by flashing different images and/or colors on the smartwatch's display. For example, under normal conditions the watch display might be blue. When feedback is provided, the color of the display can change (e.g., to red or flashing red). The frequency of the flashing can increase until it catches the speaker's attention (which the speaker can acknowledge, e.g., by pressing a button, or in some similar manner acknowledging the prompt). The display can return to a normal color/stop flashing when the speaker acknowledges the message. Additionally, a vibrating alert feature may be used to get the speaker's attention. For instance, when the smartwatch vibrates, the speaker will know to read information off of the display.

Providing feedback to the speaker is, however, not limited to alerts generated directly through the smartwatch. By way of example only, speakers sometimes use teleprompters or other similar electronic visual aids to display notes and/or copies of their speech. Thus, according to the present techniques, a duplicate message/alert (to that displayed on the speaker's smartwatch) may also be provided to the speaker on the teleprompter display. This message can be sent from the speaker's smart watch to the teleprompter (e.g., using Bluetooth technology).

Figure 1:
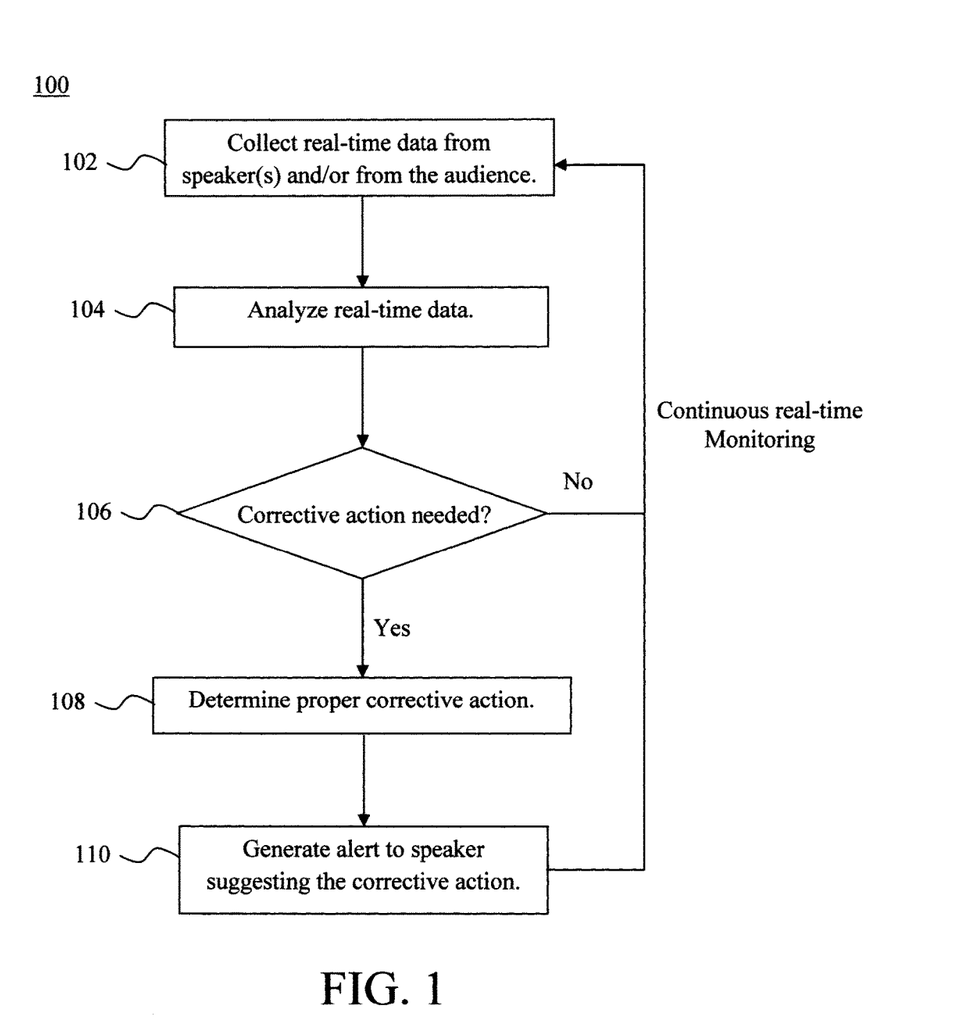
FIG. 1 is a diagram illustrating an exemplary methodology for providing real-time feedback to a public speaker according to an embodiment of the present invention.

Given the above general overview of the present techniques, an exemplary methodology 100 is now described by way of reference to FIG. 1 for providing real-time feedback to a public speaker. In step 102, real-time data is collected from the speaker(s) and/or from one or more members of the audience via the mobile device(s) (e.g., smartwatches) worn by the speaker/audience members. The various types of sensor data that can be collected by the smartwatch technology were described in detail above. In a basic sense, the present techniques can be employed to simply collect real-time data from the speaker. This data can then be analyzed and used to provide helpful (real-time) feedback to the speaker about his/her performance.

However, by also collecting audience member data (in addition to data from the speaker) a more comprehensive assessment can be made of the interaction between the speaker and the audience. Namely, as noted above, the speaking performance can vary depending on the particular audience, venue, time of day, etc. The subtleties of these factors can be better garnered by assessing both the speaker and audience member components. It also may be the case that some (or all) of the audience members are at a remote location (i.e., not physically in attendance at the speaker's location and, e.g., are watching a live broadcast of the speaker's presentation). In that case, the speaker cannot always view the audience to gauge their reaction and level of interest. Collecting real-time data from the audience (including those at the remote location(s)) will provide feedback to the speaker that he/she would not normally have in such situations.

Further, as noted above, there might be multiple speakers, and in step 102 real-time data is collected from each of the speakers. That way, the performance of the speakers can be collectively monitored.

In step 104, the real-time data (collected in step 102) is analyzed, and in step 106 a determination is made as to whether corrective action is needed to improve the speaker's performance. According to an exemplary embodiment, the determination for whether corrective action is needed can be based on a set of predetermined threshold values which may optionally be set by the speaker. For instance, the speaker can establish baseline EDA and/or heart rate readings when the speaker is in a calm state, and can set a threshold value above which the determination is made that the speaker is experiencing nervousness, and thus may be expressing characteristics (e.g., pacing, talking too fast, etc.) for which corrective action is needed. Alternatively, the predetermined threshold value can be set based on standard values. For instance, a given user (i.e., the speaker and/or an audience member) can be initially queried for their characteristics (i.e., age, height, weight, etc.) and from that a standard range of heart rate values, blood oxygen levels, EDA signals, etc. can be established for when the person is at rest, under stress, etc.

In a similar manner, the movement, trajectory, and/or pose of the speaker can be analyzed given a predetermined threshold. For instance, it is not practical to take action every time some movement of the speaker is detected. However, if the speaker moves his hands, or walks back and forth more than a predetermined number of times, then that might be indicative of unnecessary hand gesturing and pacing. This threshold may be predetermined by the speaker and/or by someone well versed in public speaking.

Regarding the speaker's speech patterns, again it is not overly practical to take action every time the speaker uses a filler word, or takes a long pause. Thus, according to an exemplary embodiment, a threshold number of incidents is set. So, for instance, if the speaker uses a filler word (e.g., "um," "uh," "er," etc.) more than a predetermined number of times in a given duration, only then is action taken to alert the speaker to take corrective action.

Further, in some instances the determination in step 106 is made based on a fusion of the data collected from different sensors. For example, if the real-time sensor data collected from the speaker (e.g., EDA, heart rate, etc.) indicates that the speaker is nervous, however the motion, pose/trajectory and speech pattern data all indicate that the speaker is not exhibiting any signs of nervousness, then there might not be a need for any corrective action. Also, for example, if the real-time sensor data collected from the speaker indicates that the speaker is calm, not pacing or excessively gesturing, etc. but the real-time data collected from audience members indicates that they are drowsy (e.g., low heart rate, etc.) then corrective action might be needed by the speaker to maintain the audience's attention.

If the determination is made in step 106 that (No) corrective action is not needed, then the process continues to monitor (i.e., collect and analyze) the data in real-time. On the other hand, if a determination is made in step 106 that (Yes) corrective action is needed, then in step 108, the proper corrective action(s) is determined.

As provided above, the corrective action might involve reminding the speaker to slow down, stop pacing and/or excessive hand gesturing, face/address the audience, etc. when there are indications from the real-time data that the speaker is nervous and/or the audience is losing interest. According to an exemplary embodiment, the proper course (s) of action are based on a series of predetermined scenarios and respective corrective actions, which are stored, e.g., in a look-up table format. For instance, if the speaker appears nervous then the proper course of action determined from the look-up table might be to remind the speaker to stop pacing and/or excessive hand gesturing and/or face/address or otherwise engage the audience, etc. For example, the speaker can engage the audience by posing questions or asking for audience participation.

In step 110, an alert is then generated to the speaker suggesting the corrective action (determined in step 108). For instance, as highlighted above, the speaker might be sent a message (e.g., along with an alert to get the speaker's attention) to his/her smartwatch with the suggested corrective action. For example, a text message can be sent to the speaker's smartwatch that states "slow down" or "stop pacing." Advantageously, this feedback is provided to the speaker in real-time, so that the speaker can adjust his/her behavior throughout the speech rather than after the fact. Additionally, this corrective action can be provided to the speaker through other means, such as on a teleprompter the speaker is using. Further, when there are multiple speakers (e.g., when each speaker is presenting on a different aspect of a particular topic), then the real-time feedback can be provided to each speaker regarding his/her performance individually. Alternatively, it may be useful to provide real-time feedback collectively to each speaker regarding his/her performance as well as that of his/her co-presenters. For instance, by having access to the feedback provided to previous presenters, a speaker can better tailor his/her performance to the particular audience, venue, topic, etc.

As shown in FIG. 1, the process continues to monitor the data it collects in real-time, thereby enabling the feedback provided to the speaker to be constantly updated when necessary. That way, the speaker can be kept constantly apprised of his/her performance.

Figure 2:
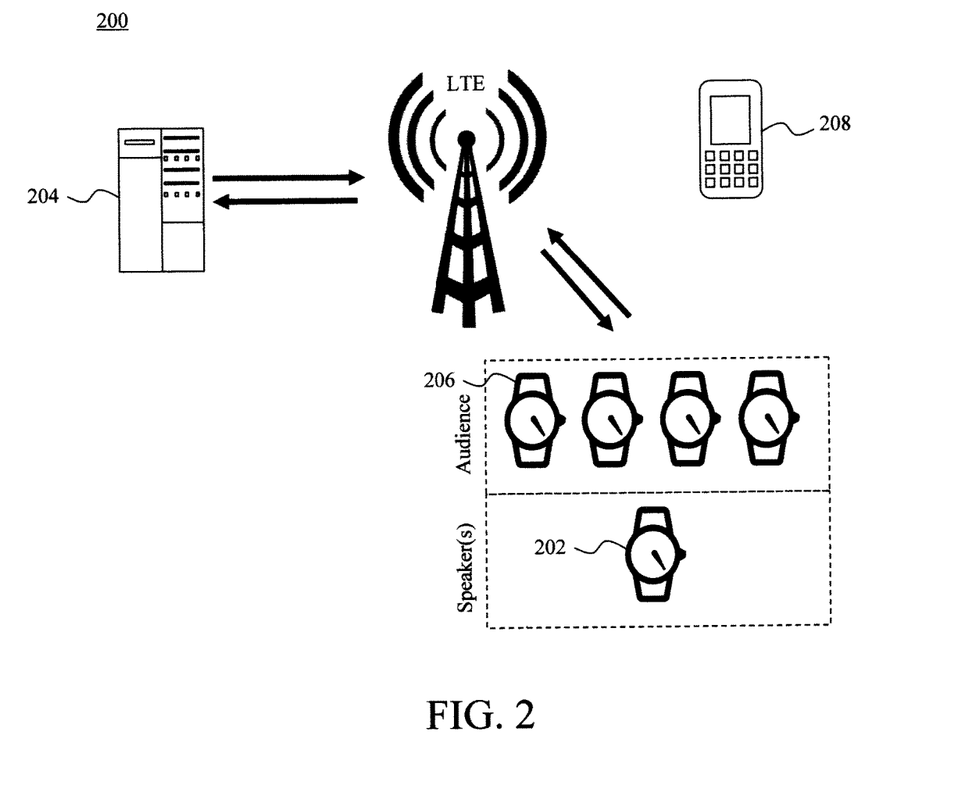
FIG. 2 is a diagram illustrating an exemplary system in which the present techniques may be implemented according to an embodiment of the present invention.

FIG. 2 is a diagram illustrating an exemplary system 200 in which methodology 100 may be implemented. As shown in FIG. 2, real-time data is collected from a speaker (or from more than one speaker—see above) via the speaker's wearable mobile devices 202, i.e., the above-described smartwatches having a variety of different sensors. As provided above, in its simplest form, the present techniques may be implemented solely with real-time data from the speaker(s), which can then be leveraged to provide feedback to the speaker(s). In some embodiments, the speaker's wearable mobile device 202 (in addition to collecting the real-time data) can also be configured to analyze the data and provide feedback to the speaker in the manner described above, i.e., the speaker's wearable mobile device 202 is configured to perform the steps of methodology 100. Alternatively, as shown in FIG. 2, the real-time data is collected from the speaker's wearable mobile device 202 by a computing device 204 which then analyzes the data and provides feedback to the speaker, i.e., the computing device 204 is configured to perform the steps of methodology 100. An exemplary apparatus that can be configured to serve as computing device 204 is described in conjunction with the description of FIG. 3, below.

However, as noted above, it is helpful to also collect real-time data (related to the speaker's performance) from the audience members. As shown in FIG. 2, this can also be achieved via audience members' wearable mobile devices 206. The speaker's and audience members' mobile devices 202/206 can be configured to communicate wirelessly with the computing device 204, or smartwatches without a cell signal or WiFi connection could transmit via an associated smartphone 208 using short-range (100 m) communication such as Bluetooth Low Energy (BLE).

As shown in FIG. 2, there might be multiple speakers from which real-time data can be collected via mobile devices 202. As provided above, in that scenario real-time feedback can be provided to each speaker individually, or alternatively, to the speakers collectively. In the latter case, the feedback provided to one speaker might be useful for the others to help fine-tune their performance for the given audience, venue, topic, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
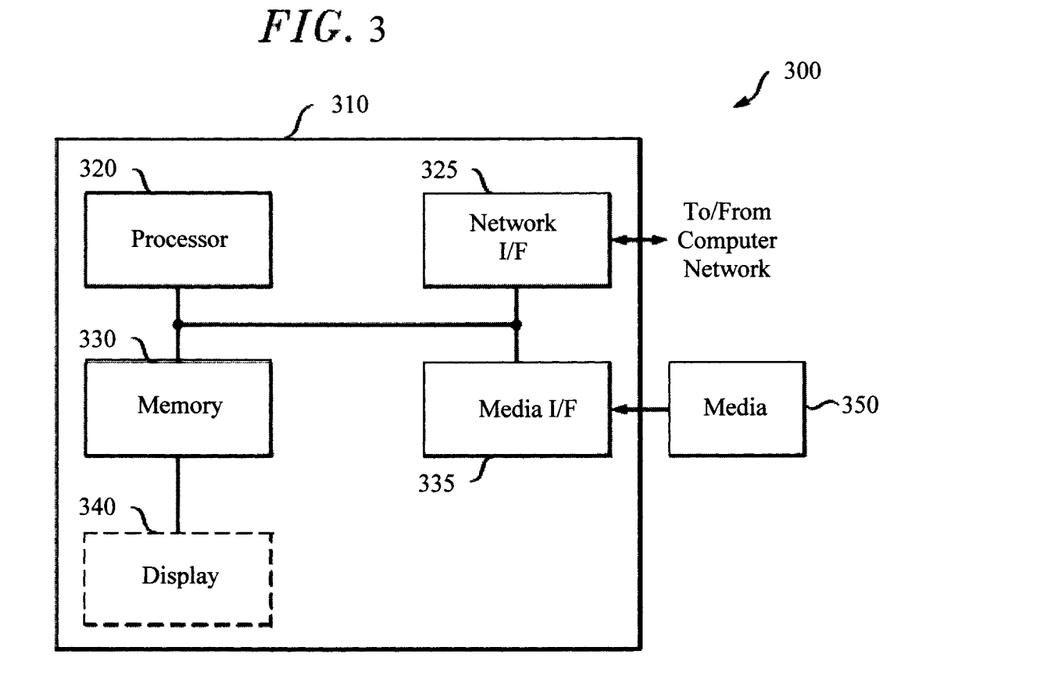
FIG. 3 is a diagram illustrating an exemplary apparatus for performing one or more of the methodologies presented herein according to an embodiment of the present invention.

Turning now to FIG. 3, a block diagram is shown of an apparatus 300 for implementing one or more of the methodologies presented herein. By way of example only, apparatus 300 can be configured to implement one or more of the steps of methodology 100 of FIG. 1.

Apparatus 300 includes a computer system 310 and removable media 350. Computer system 310 includes a processor device 320, a network interface 325, a memory 330, a media interface 335 and an optional display 340. Network interface 325 allows computer system 310 to connect to a network, while media interface 335 allows computer system 310 to interact with media, such as a hard drive or removable media 350.

Processor device 320 can be configured to implement the methods, steps, and functions disclosed herein. The memory 330 could be distributed or local and the processor device 320 could be distributed or singular. The memory 330 could be implemented as an electrical, magnetic or optical memory, or any combination of these or other types of storage devices. Moreover, the term "memory" should be construed broadly enough to encompass any information able to be read from, or written to, an address in the addressable space accessed by processor device 320. With this definition, information on a network, accessible through network interface 325, is still within memory 330 because the processor device 320 can retrieve the information from the network. It should be noted that each distributed processor that makes up processor device 320 generally contains its own addressable memory space. It should also be noted that some or all of computer system 310 can be incorporated into an application-specific or general-use integrated circuit.

Optional display 340 is any type of display suitable for interacting with a human user of apparatus 300. Generally, display 340 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for providing real-time feedback to a speaker making a presentation to an audience, the method comprising the steps of:

collecting real-time data from the speaker and from members of the audience during the presentation wherein the real-time data collected provides a combination of feedback from the speaker and from the members of the audience, wherein the real-time data is collected via mobile devices worn by the speaker and by the members of the audience, wherein the mobile devices comprise smartwatches worn on a user's wrist comprising a trajectory and pose sensor configured to detect the user's arm and hand movements and a speech detector sensor configured to recognize certain words and speech patterns, wherein the real-time data collected from the speaker further comprises at least i) trajectory and pose data for the speaker including the speaker's arm and hand movements as well as ii) word recognition and speech pattern data including recognition of certain words spoken by the speaker, the speed at which the speaker is speaking, and pauses the speaker makes, which are all collected and analyzed by the smartwatch;

analyzing the real-time data collected from the speaker to make a determination of whether corrective action is needed to improve performance; and generating a real-time alert to the speaker on the smartwatch worn on the speaker's wrist suggesting the corrective action if the real-time data indicates that corrective action is needed to improve performance, otherwise continuing to collect data from the speaker in real-time, wherein the determination of whether corrective action is needed is based on the combination of feedback from the speaker and from the members of the audience wherein the real-time alert to the speaker is generated when the real-time data collected from the speaker indicates that no corrective action is needed but the real time data collected from the members of the audience indicates that the corrective action is needed to improve performance, and wherein the speaker is one of multiple co-presenters presenting on different aspects of a particular topic to the audience, the method further comprising the steps of:

collecting the real-time data from each of the co-presenters via smartwatches worn by each of the co-presenters; and providing the real-time feedback to the speaker on the smartwatch worn on the speaker's wrist regarding the speaker's performance and a performance of each of the co-presenters.

2. The method of claim 1, wherein the real-time data collected from the speaker comprises physiological data for the speaker selected from the group consisting of: skin electrical characteristics, blood oxygen levels, heart rate, pulse, and combinations thereof.

3. The method of claim 1, wherein the trajectory and pose data collected from the speaker further comprises the real-time data selected from the group consisting of: movement, speed, direction, orientation, location, and combinations thereof.

4. The method of claim 1, wherein the real-time data collected from the speaker comprises environmental data.

5. The method of claim 1, wherein the mobile devices comprise at least one sensor selected from the group consisting of: an electrodermal activity (EDA) sensor, a pulse oximeter sensor, a heart rate sensor, and combinations thereof.

6. The method of claim 1, wherein the mobile devices comprise at least one sensor selected from the group consisting of: a gyroscope sensor, a global positioning system (GPS) sensor, and combinations thereof.

7. The method of claim 1, wherein the mobile devices comprise an air temperature sensor.

8. The method of claim 1, wherein at least one of the members of the audience is at a remote location relative to the speaker.

9. The method of claim 1, further comprising the step of:
generating, in real-time, an alert to each of the co-presenters suggesting the corrective action.

10. The method of claim 1, wherein the real-time alert comprises a text message suggesting the corrective action needed to improve performance.

11. The method of claim 10, wherein the text message is accompanied by at least one of an audible or visual alert.

12. The method of claim 1, further comprising the step of:
determining a proper corrective action to improve performance based on the real-time data collected from the speaker.

13. The method of claim 12, wherein the proper corrective action to improve performance is determined based on a series of predetermined scenarios and respective corrective actions.

14. The method of claim 13, wherein the series of predetermined scenarios and respective corrective actions are accessed via a look-up table format.

15. A computer program for providing real-time feedback to a speaker making a presentation to an audience, the computer program product comprising a computer readable storage medium having program instructions embodied therewith, the program instructions executable by a computer to cause the computer to:

collect real-time data from the speaker and from members of the audience during the presentation wherein the real-time data collected provides a combination of feedback from the speaker and from the members of the audience, wherein the real-time data is collected via mobile devices worn by the speaker and by the members of the audience, wherein the mobile devices comprise smartwatches worn on a user's wrist comprising a trajectory and pose sensor configured to detect the user's arm and hand movements and a speech detector sensor configured to recognize certain words and speech patterns, wherein the real-time data collected from the speaker further comprises at least i) trajectory and pose data for the speaker including the speaker's arm and hand movements as well as ii) word recognition and speech pattern data including recognition of certain words spoken by the speaker, the speed at which the speaker is speaking, and pauses the speaker makes, which are all collected and analyzed by the smartwatch;

analyze the real-time data collected from the speaker to make a determination of whether corrective action is needed to improve performance; and generate a real-time alert to the speaker on the smartwatch worn on the speaker's wrist suggesting the corrective action if the real-time data indicates that corrective action is needed to improve performance, otherwise continuing to collect data from the speaker in real-time, wherein the determination of whether corrective action is needed is based on the combination of feedback from the speaker and from the members of the audience wherein the real-time alert to the speaker is generated when the real-time data collected from the speaker indicates that no corrective action is needed but the real-time data collected from the members of the audience indicates that the corrective action is needed to improve performance, and wherein the speaker is one of multiple co-presenters presenting on different aspects of a particular topic to the audience, and wherein the program instructions further cause the computer to:

collect the real-time data from each of the co-presenters via smartwatches worn by each of the co-presenters; and provide the real-time feedback to the speaker on the smartwatch worn on the speaker's wrist regarding the speaker's performance and a performance of each of the co-presenters.

* * * * *